United States Patent
Takaya

(10) Patent No.: US 10,616,450 B2
(45) Date of Patent: Apr. 7, 2020

(54) PRINTED MATTER, PRINTED MATTER MANUFACTURING METHOD, AND IMAGE FORMING APPARATUS

(71) Applicant: Tomohiro Takaya, Tokyo (JP)

(72) Inventor: Tomohiro Takaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/212,757

(22) Filed: Dec. 7, 2018

(65) Prior Publication Data

US 2019/0182410 A1 Jun. 13, 2019

(30) Foreign Application Priority Data

Dec. 8, 2017 (JP) ................................ 2017-236288
Nov. 27, 2018 (JP) ................................ 2018-221135

(51) Int. Cl.
*H04N 1/60* (2006.01)
*H04N 1/54* (2006.01)
*B41J 2/21* (2006.01)

(52) U.S. Cl.
CPC ............. *H04N 1/6094* (2013.01); *H04N 1/54* (2013.01); *B41J 2/2114* (2013.01)

(58) Field of Classification Search
CPC ........ H04N 1/6094; H04N 1/54; B41J 2/2114
See application file for complete search history.

(56) References Cited

U.S. PATENT DOCUMENTS

| | | |
|---|---|---|
| 2006/0044617 A1 | 3/2006 | Wang et al. |
| 2012/0320386 A1 | 12/2012 | Sone et al. |
| 2016/0185130 A1* | 6/2016 | Sugai ................... B41J 11/0015 347/16 |
| 2016/0352966 A1 | 12/2016 | Itoh |
| 2017/0057245 A1* | 3/2017 | Morita ................... B41J 2/2114 |

FOREIGN PATENT DOCUMENTS

| | | |
|---|---|---|
| EP | 2 945 362 A1 | 11/2015 |
| JP | 2009-092767 | 4/2009 |
| JP | 2011-164555 | 8/2011 |
| JP | 2013-020225 | 1/2013 |
| JP | 2016-066830 | 4/2016 |

OTHER PUBLICATIONS

Extended European Search Report dated Apr. 8, 2019 in European Patent Application No. 18210882.9 citing documents AA-AB and AO therein, 9 pages.

* cited by examiner

*Primary Examiner* — Quang N Vo
(74) *Attorney, Agent, or Firm* — Oblon, McClelland, Maier & Neustadt, L.L.P.

(57) ABSTRACT

A printed matter includes a recording medium; a chromatic color layer formed, with a chromatic colorant, on the recording medium; a plurality of first regions formed with a transparent material and arranged at intervals on the chromatic color layer; and a plurality of second regions each of which is disposed between adjacent two of the plurality of first region. A first unit material amount calculated by dividing an amount of the transparent material in the plurality of first regions with an area of the plurality of first regions is different from a second unit material amount calculated by dividing an amount of the transparent material in the plurality of second regions with an area of the plurality of second regions.

40 Claims, 7 Drawing Sheets

PRINTED MATTER, PRINTED MATTER MANUFACTURING METHOD, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2017-236288, filed on Dec. 8, 2017, and 2018-221135, file on Nov. 27, 2018, in the Japan Patent Office, the entire disclosure of each of which is hereby incorporated by reference herein.

BACKGROUND

Technical Field

The present disclosure relates to a printed matter, a method for manufacturing a printed matter, and an image forming apparatus.

Description of the Related Art

Attempts have been made to print metallic color patterns on recording media using an image forming apparatus employing, for example, an electrophotographic method or an inkjet method. For example, printing using a metallic color material for, such as, gold color in addition to color materials of four colors of cyan (C), magenta (M), yellow (Y), and black (K), which is also referred to as CMYK, has been tried. However, metallic luster attained with the metallic color material may be insufficient.

In order to attain metallic luster in a pseudo manner, attempts are also made to perform printing using a glossy transparent material. The transparent material is also referred to as "clear material". The glossy transparent material enhances smoothness of the surface of the printed matter and enhances the gloss level of the printed matter. For example, a proposed approach involves referring to red, green, and blue (RGB) data of a target pixel and a color separation look-up table (LUT), acquiring CMYK values of the target pixel and a value of the glossy transparent material, and printing an image in which the hue of diffused light coincides with the hue of specularly reflected light.

SUMMARY

According to an embodiment of the present disclosure, a printed matter includes a recording medium; a chromatic color layer formed, with a chromatic colorant, on the recording medium; a plurality of first regions formed with a transparent material and arranged at intervals on the chromatic color layer; and a plurality of second regions each of which is disposed between adjacent two of the plurality of first region. A first unit material amount calculated by dividing an amount of the transparent material in the plurality of first regions with an area of the plurality of first regions is different from a second unit material amount calculated by dividing an amount of the transparent material in the plurality of second regions with an area of the plurality of second regions.

According to another embodiment, an image forming apparatus includes a printer configured to form an image on a recording medium, and circuitry configured to acquire input data indicating an area and a color of a metallic luster area expressing metallic luster of a chromatic color on the recording medium, and generate print data from the input data, The print data includes chromatic color layer data representing data of a chromatic color layer formed with a chromatic colorant, and transparent material layer data representing data of a transparent material layer, The transparent material layer includes a plurality of first regions arranged at intervals and a plurality of second regions each of which is disposed between adjacent two of the plurality of first regions. The transparent material layer data indicates that a first unit material amount calculated by dividing an amount of the transparent material in the plurality of first regions with an area of the plurality of first regions is different from a second unit material amount calculated by dividing an amount of the transparent material in the plurality of second regions with an area of the plurality of second regions. The circuitry is further configured to form, with the printer, the chromatic color layer on the recording medium based on the chromatic color layer data; and form, with the printer, the transparent material layer on the chromatic color layer based on the transparent material layer data.

Another embodiment provides a printed matter manufacturing method. The method includes designating an area and a color of a metallic luster area expressing chromatic metallic luster on a recording medium and generating print data based on the area and the color designated. The print data includes chromatic color layer data representing data of a chromatic color layer formed with a chromatic colorant, and transparent material layer data representing data of a transparent material layer formed with a transparent material. The transparent material layer includes a plurality of first regions arranged at intervals and a plurality of second regions each of which is disposed between adjacent two of the plurality of first regions. The transparent material layer data indicates that a first unit material amount calculated by dividing an amount of the transparent material in the plurality of first regions with an area of the plurality of first regions is different from a second unit material amount calculated by dividing an amount of the transparent material in the plurality of second regions with an area of the plurality of second regions. The method further includes forming the chromatic color layer on the recording medium based on the chromatic color layer data, and forming the transparent material layer on the chromatic color layer based on the transparent material layer data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
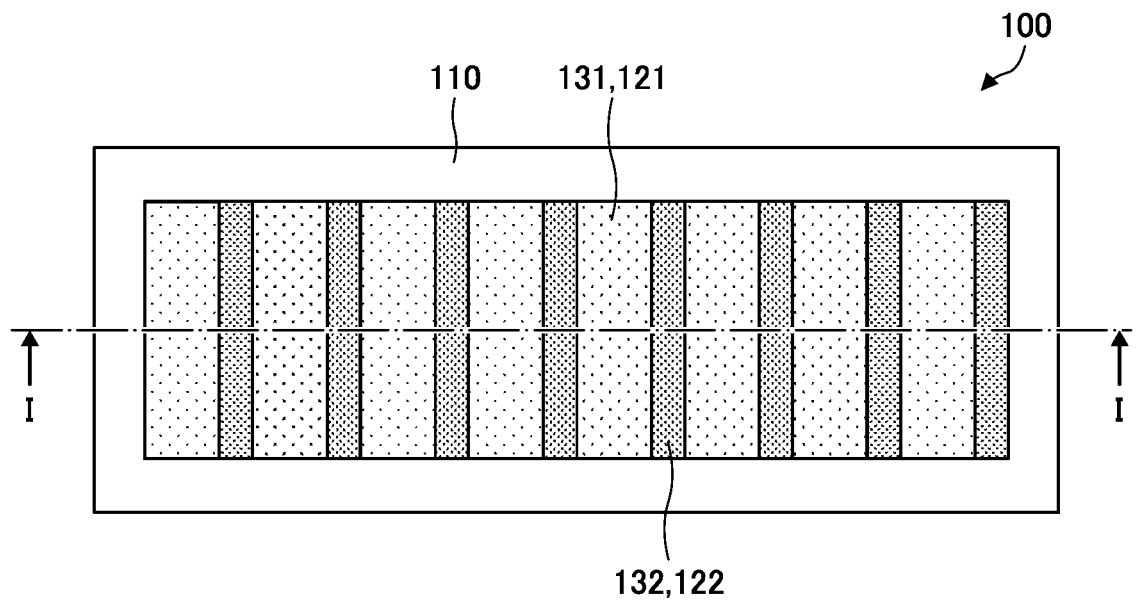
FIG. 1A is a schematic plan view illustrating a configuration of a printed matter according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

As a result of intensive studies to express the texture of metal color, the inventor has found that chromatic color saturation is insufficient in an attempt of artificially expressing metallic luster of chromatic color using such a glossy transparent material. The inventor has also found that insufficient saturation is caused because specularly reflected light by a glossy transparent material layer is excessive and specularly reflected light by a chromatic material layer is insufficient. Further, according to the study of the inventor, when the amount per unit area of the transparent material (the amount of the transparent material divided by the area of the glossy transparent material layer) in the glossy transparent material layer is changed, excessive specular reflection by the glossy transparent material is suppressed, and the specularly reflected light by the chromatic material layer is strengthened, thereby remarkably improving the saturation.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, embodiments of this disclosure are described. As used herein, the singular forms "a", "an", and "the" are intended to include the plural forms as well, unless the context clearly indicates otherwise.

In the following description, a clear toner (i.e., transparent toner) is used as an example of glossy transparent material, and a chromatic color toner is used as an example of chromatic colorant. However, embodiments according to the present disclosure are not limited to toner, but can adapt to configurations using ink or the like.

Embodiment 1

Figure 1B:
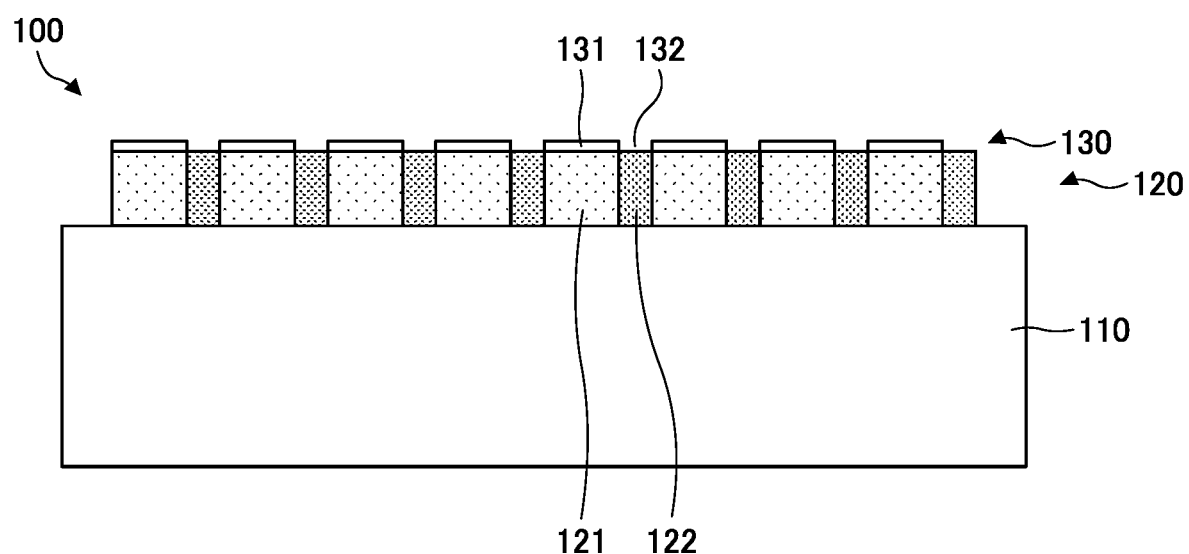
FIG. 1B is a schematic cross-sectional view taken along a line I-I in FIG. 1A.

Embodiment 1 is described. Embodiment 1 relates to a printed matter. FIG. 1A is a schematic plan view illustrating a configuration of a printed matter 100 according to Embodiment 1, and FIG. 1B is a schematic cross-sectional view taken along a line I-I in FIG. 1A.

The printed matter 100 according to Embodiment 1 includes a recording medium 110, a chromatic toner layer 120 (i.e., a chromatic material layer) on the recording medium 110, and a clear toner layer 130 (i.e., a glossy transparent material layer) on the chromatic toner layer 120. The chromatic toner layer 120 includes a plurality of first chromatic regions 121 and a plurality of second chromatic regions 122. In the plan view of FIG. 1A, the first chromatic region 121 and the second chromatic region 122 alternate, for example, at regular intervals. In the present embodiment, a saturation S2 of the second chromatic region 122 is higher than a saturation S1 of the first chromatic region 121. The clear toner layer 130 (a transparent material layer) formed with clear toner (transparent material) includes a plurality of first regions 131 (transparent material regions) respectively overlapping with the first chromatic regions 121 in the cross-sectional view and a plurality of second regions 132 respectively overlapping with the second chromatic regions 122 in the cross-sectional view. The second regions 132 are disposed between adjacent two of the plurality of first regions 131. In the present embodiment, the amount per unit area of clear toner of the second region 132 (the amount of clear toner of the second region 132 divided by the area of the second region 132, hereinafter "amount t2") is smaller than the amount per unit area of clear toner of the first region 131 (the amount of clear toner of the first region 131 divided by the area of the first region 131, hereinafter "amount t1").

The amount t1 (first unit material amount) can be calculated by either dividing the amount of clear toner (transparent material) in the plurality of the first regions 131 with the area of the plurality of first regions 131 or dividing the amount of clear toner in one of the plurality of the first regions 131 with the area of that first region 131. Alternatively, the amount t1 can be calculated by dividing the amount of clear toner in a given area of the first region 131 with the given area. The same applies to the amount t2 (second unit material amount).

Preferably, the amount t2 per unit area of clear toner of the second region 132 is zero. In other words, in FIG. 1B, the clear toner layer 130 is formed on only the first chromatic regions 121. The recording medium 110 is high-quality paper, gloss coated paper, matte coated paper, overhead projector (OHP) film, plastic film, or the like.

The chromatic toner layer 120 includes cyan (C) toner, magenta (M) toner, or yellow (Y) toner, or any combination thereof, and can further includes black (K) toner. The clear toner layer 130 is a layer of clear toner. Generally, the clear toner is a colorless toner without a colorant such as a pigment. However, the clear toner is not necessarily completely colorless as long as the total light transmittance is equal to or greater than 30%. The total light transmittance is measured in accordance with the total light transmittance test methods of Japanese Industrial Standards (JIS) K7361-1 and International Organization for Standardization (ISO) 13468-1. A sample (prepared toner) is irradiated with visible light emitted from a halogen lamp being a light source, to measure the total light transmittance.

Figure 2:
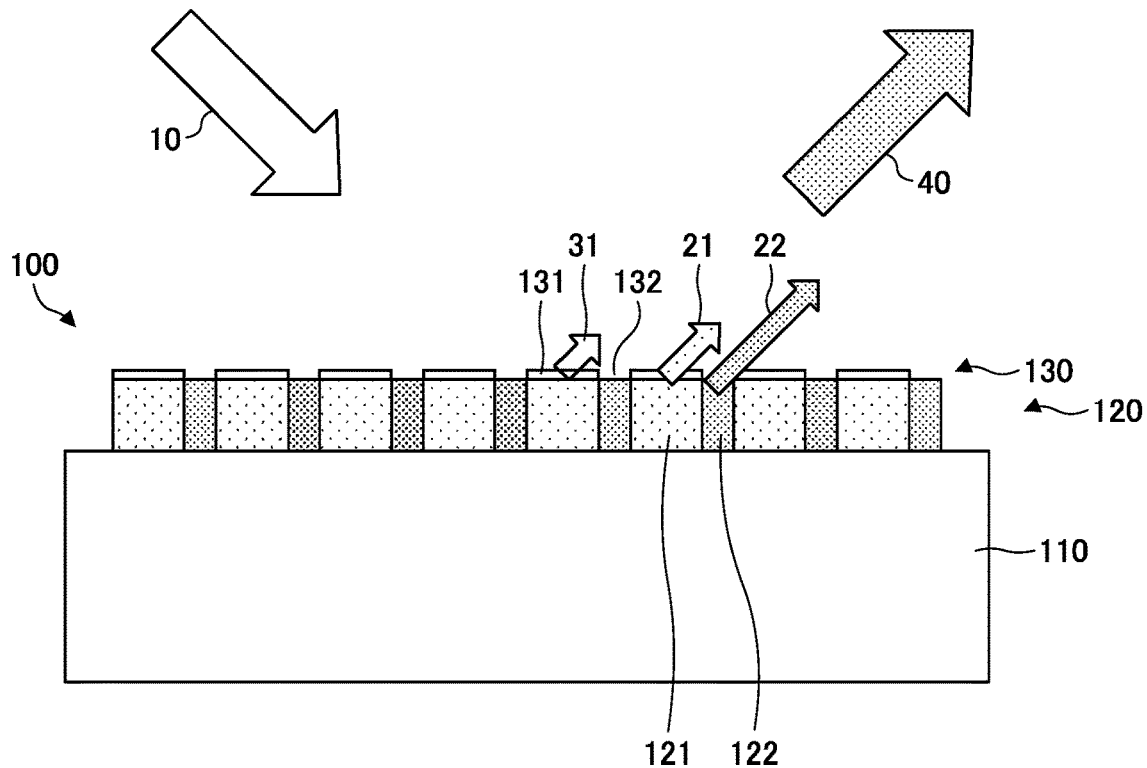
FIG. 2 is a schematic diagram illustrating an effect of the printed matter according to Embodiment 1.

Here, an effect of the printed matter 100 according to Embodiment 1 will be described. FIG. 2 is a schematic diagram illustrating the effect of the printed matter 100 according to Embodiment 1. When the printed matter 100 is irradiated with light 10, in the first region 131, a part of the light 10 is reflected by the clear toner layer 130 (specularly reflected light 31), and another part is reflected by the first chromatic region 121 under the first region 131 (specularly reflected light 21). Yet another part is reflected by the second chromatic region 122 (specularly reflected light 22). In FIGS. 1B and 2, since the amount t2 per unit area of the clear toner of the second region 132 is zero, the light 10 is not reflected by the second region 132. Therefore, most of the light incident on the first region 131 is reflected by the first region 131 and the first chromatic region 121 although the manner of reflection depends on the incident angle. The specularly reflected light 21 from the first chromatic region 121 contains the chromatic color of the first chromatic region 121. The specularly reflected light 31 from the first area 131 has the same brightness as the light 10. Therefore, this configuration can obtain the specularly reflected light having the chromatic color of the first chromatic region 121 with a high gloss level. On the other hand, the light incident on the second region 132 is not reflected by the clear toner layer 130. Most of the light incident on the second region 132 is reflected by the second chromatic region 122 although the manner of reflection depends on the incident angle. The specularly reflected light 22 from the second chromatic region 122 includes the chromatic color of the second chromatic region 122. In the present embodiment, the saturation S2 of the second chromatic region 122 is higher than the saturation S1 of the first chromatic region 121 covered with the clear toner. Therefore, the specularly reflected light including the high-saturation chromatic color of the second chromatic region 122 can be obtained.

In this embodiment, the first chromatic region 121 and the second chromatic region 122 are adjacent to each other, and the first region 131 and the second region 132 are adjacent to each other, corresponding to the first chromatic region 121 and the second chromatic region 122. Accordingly, in human vision, specularly reflected light 40 reflected from the printed matter 100 attains both of high gloss and high saturation.

With such an effect of the printed matter 100, a high saturation can be obtained while obtaining high gloss, thereby satisfactory expressing the texture of the metallic color in a pseudo manner.

In the present embodiment, the second region 132 is a region where the amount t2 per unit area of the clear toner is zero. Alternatively, when the amount t2 per unit area of clear toner of the second region 132 is smaller than the amount t1 per unit area of clear toner of the first region 131, the amount t2 is not necessarily zero. For example, the amount t2 per unit area of the second region 132 can be equal to or smaller than 10% of the amount t1 per unit area of the first region 131. Even when the amount t2 of the second region 132 is not zero, the reflection by the second region 132 is weaker than the reflection by the first region 131, and the reflection by the second chromatic region 122 is stronger than the reflection by the first chromatic region 121. Accordingly, high saturation can be obtained.

In the present embodiment, the saturation S2 of the second chromatic region 122 is higher than the saturation S1 of the first chromatic region 121. Alternatively, the saturation S2 can be equal to the saturation S1. Even when the saturations S1 and S2 are equivalent, high saturation can be obtained since the reflection by the second chromatic region 122 is stronger than the reflection by the first chromatic region 121.

Preferably, the first region 131 and the second region 132 are arranged at regular intervals to make color unevenness less perceptible to human eyes.

The area of the first region 131 is preferably larger than the area of the second region 132 to enhance the gloss level, which is one feature of metallic luster. Although not particularly limited, the area ratio between the first region 131 and the second region 132 is, for example, 2:1. The area ratio can be 3:1, 3:2, 1:1, or the like.

Although not particularly limited, the resolution of the printed matter 100 is preferably equal to or greater than 300 dots per inch (dpi), and more preferably equal to or greater than 600 dpi. Such resolution can make specularly reflected light from each region less distinguishable in human perception. According to an aspect of the present disclosure, a printed matter includes a recording medium, a chromatic material layer on the recording medium, a glossy transparent material layer on the chromatic material layer. The transparent material layer includes a first region having a first colorant amount per unit area and a second region having a second colorant amount per unit area different from the first colorant amount. According to an aspect, a bottom of each of the plurality of recesses is defined by the chromatic material layer.

Embodiment 2

Figure 3:
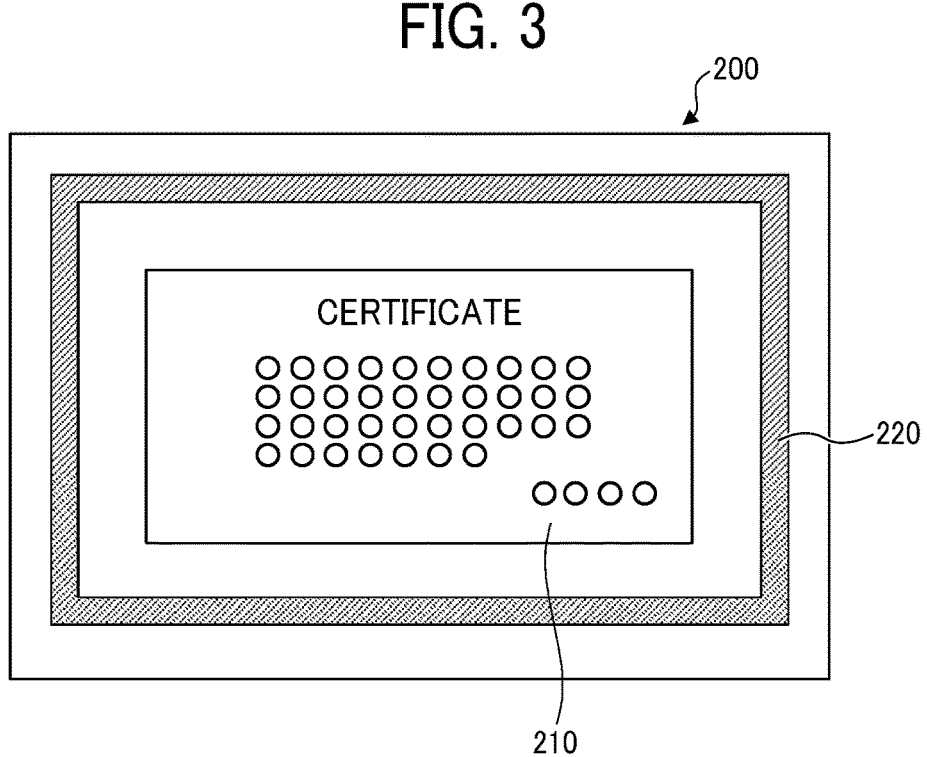
FIG. 3 is a schematic diagram illustrating a product to be manufactured through a printed matter manufacturing method according to Embodiment 2.
Figure 4:
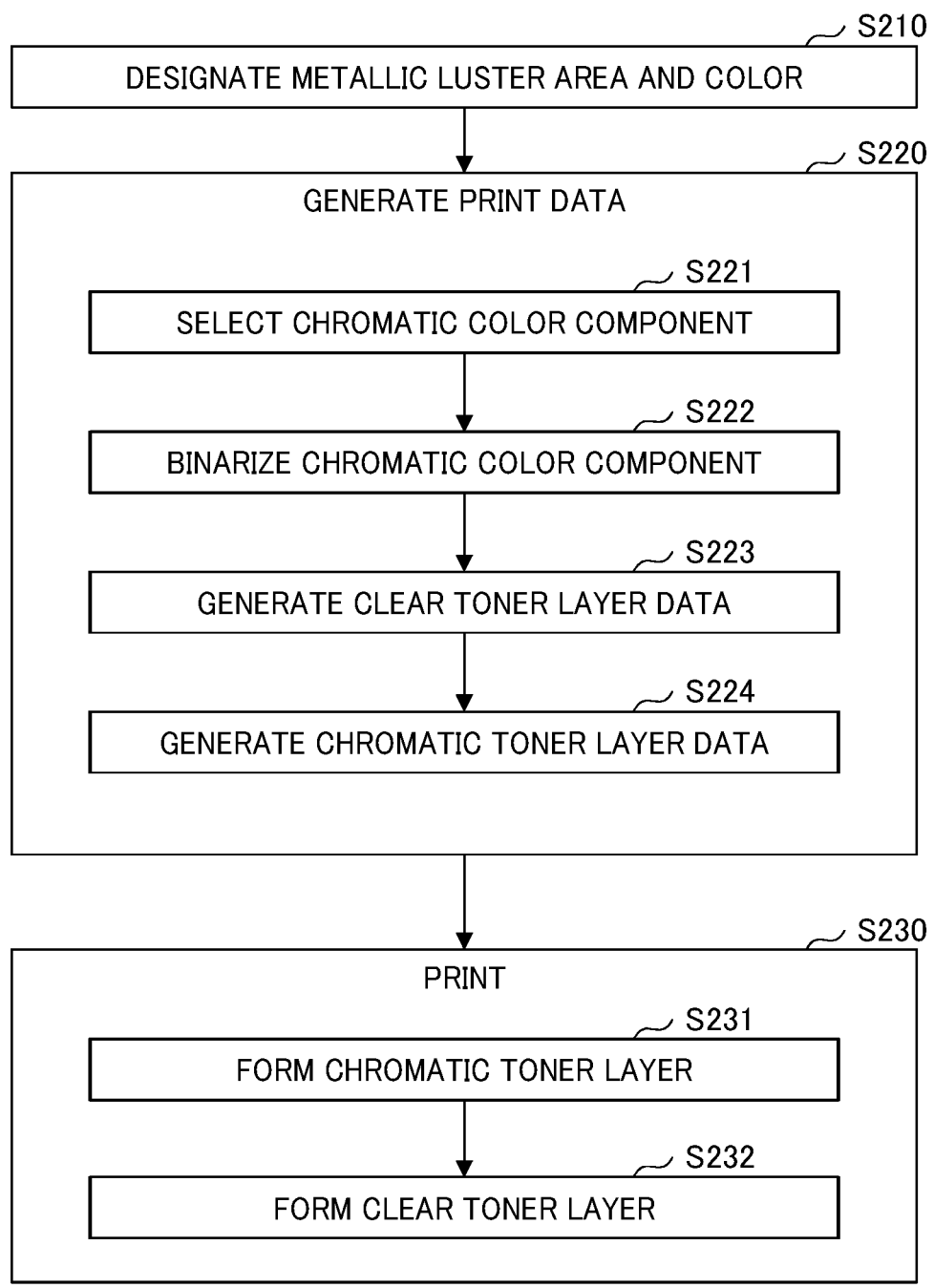
FIG. 4 is a flowchart of the method for manufacturing the printed matter according to Embodiment 2.

Next, Embodiment 2 is described. Embodiment 2 relates to a method for manufacturing a printed matter. FIG. 3 is a schematic diagram illustrating a printed matter to be manufactured according to Embodiment 2. FIG. 4 is a flowchart of a printed matter manufacturing method according to Embodiment 2. FIGS. 5A to 5F are schematic diagrams illustrating the method for manufacturing the printed matter according to Embodiment 2 in the order of processes. For example, the method is executed by a processor of an image forming apparatus or a computer.

As illustrated in FIG. 3, the printed matter to be manufactured according to Embodiment 2 is a certificate 200 (e.g., certificate of commendation) printed on a recording medium 250, and the certificate 200 includes a text area 210 and a peripheral area 220 around the text area 210. In the peripheral area 220, a decoration pattern including, for example, animals and plants, is drawn in gold color. Here, as an example, the printed matter is manufactured with a resolution of 600 dpi. FIGS. 5A to 5F illustrate a rectangular range included in the decoration pattern in the peripheral area 220, as an example of a metallic luster area.

Figure 5A:
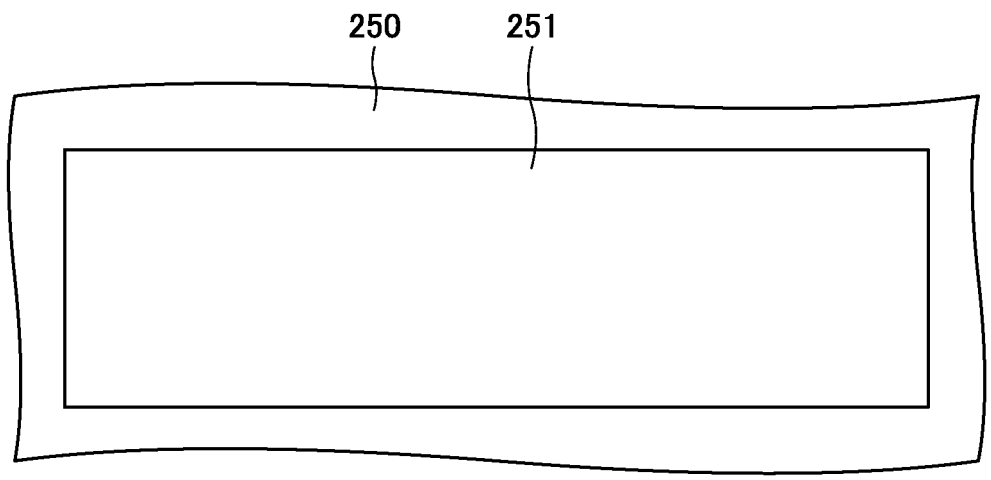
FIG. 5A is a schematic diagram illustrating a printed matter manufacturing method according to Embodiment 2.

In Embodiment 2, first, as illustrated in FIG. 5A, the area and the color of a metallic luster area expressing the metallic luster of chromatic color on the recording medium 250 are designated (S210). For example, as the metallic luster area, a decoration pattern area 251 (e.g., the metallic luster area) is designated and gold color is designated as the color thereof. To draw a pattern in gold, values of cyan, magenta, yellow, black, and transparent color are set, for example, as "C: 0%, M: 12%, Y: 57%, K: 6%, CL: 100%", where CL represents "transparent color".

Next, print data is generated (S220).

Figure 5B:
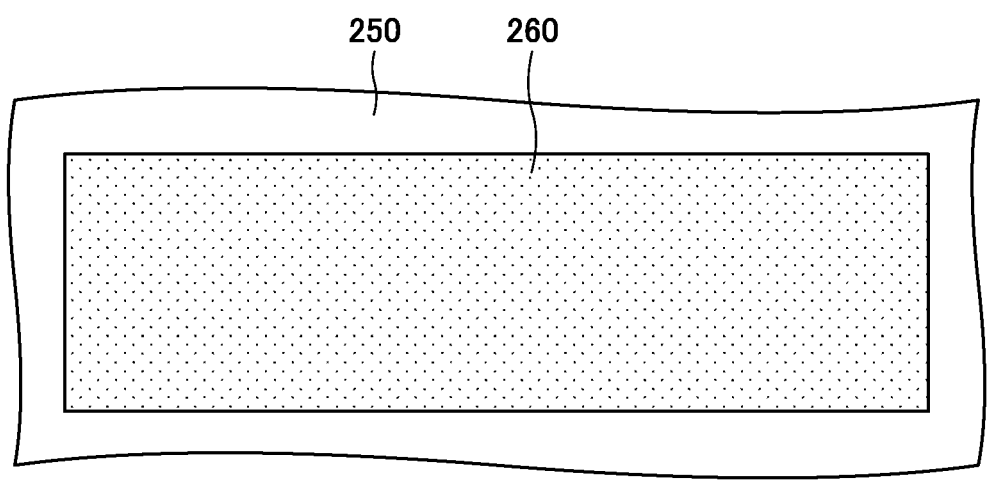
FIG. 5B is another schematic view illustrating the printed matter manufacturing method according to Embodiment 2 subsequent to a step illustrated in FIG. 5A.

In preparation of print data, initially, of the chromatic color components (cyan, magenta, and yellow) of the gold color, yellow is selected (S221). Although a chromatic color component other than yellow can be selected, selecting yellow, which is closest to the glossy gold color among cyan, magenta, and yellow, is preferable. Since black is an achromatic color, black is excluded from the selection. As illustrated in FIG. 5B, a yellow pattern 260 matches the decoration pattern area 251.

Figure 5C:
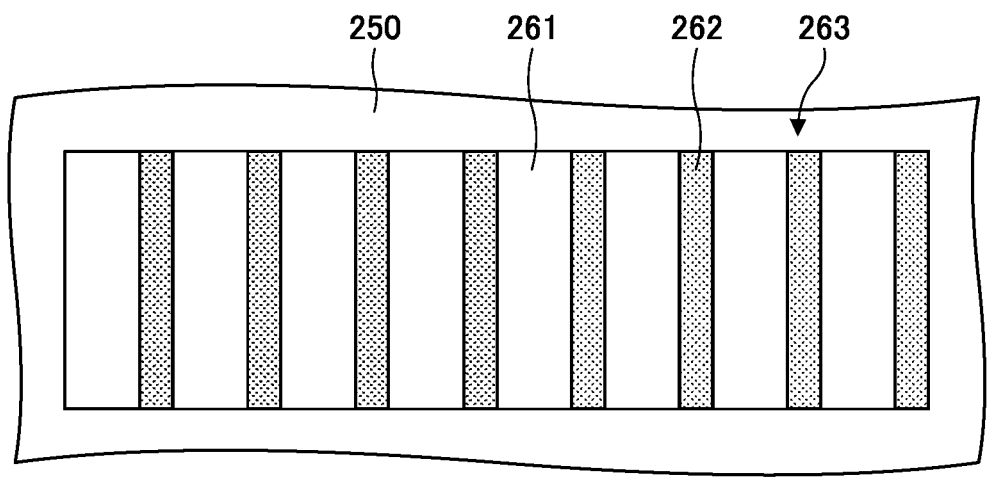
FIG. 5C is another schematic view illustrating the printed matter manufacturing method according to Embodiment 2 subsequent to a step illustrated in FIG. 5B.

Next, the gradation value of the yellow pattern 260 is binarized (S222). Here, as illustrated in FIG. 5C, on the premise that the area ratio between a first portion 261 assigned with a yellow gradation value being 0% and a second portion 262 assigned with a yellow gradation value being 100% is 2:1, provisionally, the yellow gradation value is changed to 33%, and binarization processing is performed to generate a binarized pattern 263 of yellow. The yellow gradation value being 0% is an example first binarized value, and the yellow gradation value being 100% is an example second binarized value. Alternatively, the area ratio between the first portion 261 and the second portion 262 can be 3:1, 3:2, 1:1, or the like.

Figure 5D:
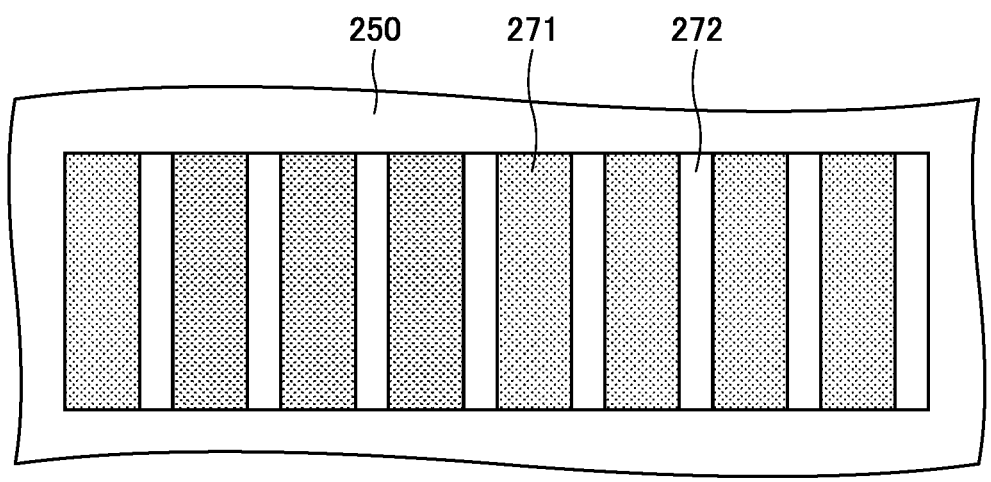
FIG. 5D is another schematic diagram illustrating the printed matter manufacturing method according to Embodiment 2 subsequent to a step illustrated in FIG. 5C.

Next, as illustrated in FIG. 5D, the transparent (clear or CL) gradation value of a portion 272 (a second transparent portion) overlapping with the second portion 262 (yellow gradation value is 100%) is changed from 100% to 0%, and the transparent gradation value of a portion 271 (a first transparent portion) overlapping with the first portion 261 (yellow gradation value is 0%) is kept at 100%. Such operation generates clear toner layer data (transparent material layer data) in which a transparent gradation value of 100% is set in the portion 271 overlapping with the first portion 261 and a transparent gradation value of 0% is set in the portion 272 overlapping with the second portion 262 (S223).

Figure 5E:
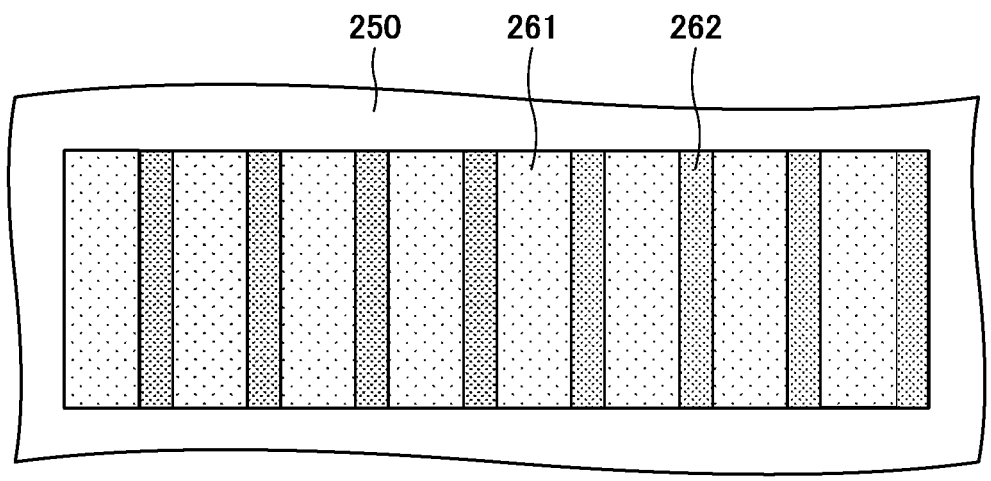
FIG. 5E is another schematic view illustrating the printed matter manufacturing method according to Embodiment 2 subsequent to a step illustrated in FIG. 5D.

Next, as illustrated in FIG. 5E, the yellow gradation value in the first portion 261 is changed from 0% to 36%. In a planar view, two thirds (⅔) of the chromatic toner layer 120 is made the first chromatic region 121, and one third (⅓) of the chromatic toner layer 120 is made the second chromatic region 122. This operation is to approximate the average of the yellow gradation values in the whole metallic luster area to the gradation value before binarization, while setting the yellow gradation value of the second chromatic region 122 at 100%. That is, if the binarized values are used as is, the average of the yellow gradation values in the entire metallic luster area is 33%. However, when the gradation value is changed to 36%, the average of the yellow gradation values can be about 57%. Such operation can generate chromatic toner layer data (chromatic material layer data) in which the average of the yellow gradation values in the entire metallic luster area is changed to be closer to the gradation value before binarization (S224). Only to make the average value close to the gradation value before binarization, alternatively, the gradation value of the second portion 262 can be changed without changing the gradation value of the first portion 261. Yet alternatively, the gradation values of both the first portion 261 and the second portion 262 can be changed. However, in order to bring the average value closer to the gradation value before binarization while obtaining high saturation, preferably, the gradation value of only the first portion 261, in which the gradation value is provisionally set to 0%, is changed.

In this manner, the print data is generated (S220). For the colors (cyan, magenta, and black) other than yellow selected in S221, the gradation value designated in S210 is used as is. Therefore, in this print data, the gradation values of the first chromatic region 121 are expressed as "C: 0%, M: 12%, Y: 36%, and K: 6%", and the gradation values of the second chromatic region 122 are expressed as "C: 0%, M: 12%, Y: 100%, and K: 6%". Further, the gradation value of the first region 131 is expressed as "CL: 100%", and the gradation value of the second region 132 is expressed as "CL: 0%".

Figure 5F:
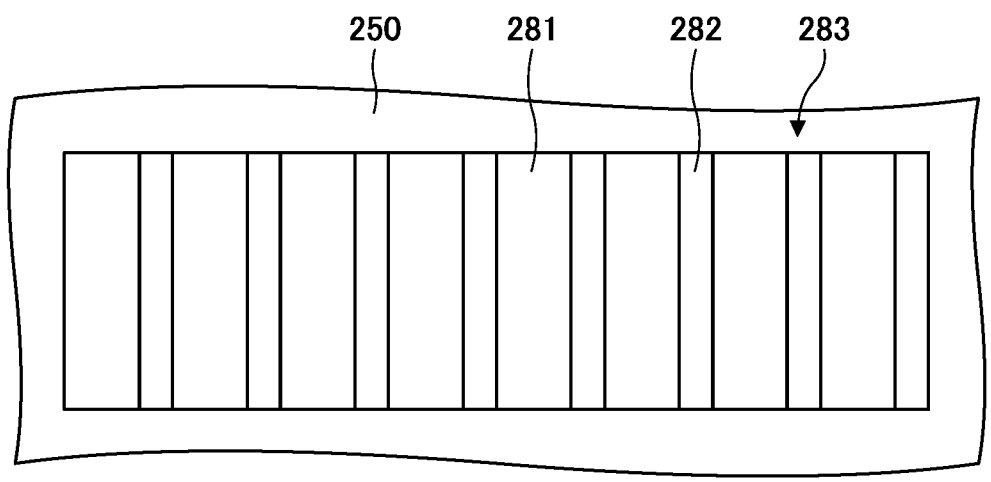
FIG. 5F is another schematic view illustrating the printed matter manufacturing method according to Embodiment 2 subsequent to a step illustrated in FIG. 5E.

After generating the print data, using the image forming apparatus, printing is performed (S230). Specifically, a chromatic toner layer is formed on the recording medium 250 according to the print data (S231). Then, a clear toner layer is formed on the chromatic toner layer (S232). A pattern 283 printed on the recording medium 250 as the result of the above-described process includes, as illustrated in FIG. 5F, an area 281 in which the first chromatic region 121 overlaps the first region 131 and an area 282 in which the second chromatic region 122 overlaps the second region 132.

In this way, a printed matter can be produced. The pattern 283 formed on the recording medium 250 can express the golden metallic luster in a pseudo manner.

Note that the binarized pattern is not limited to a pattern in which two types of regions are arranged in one direction but can be a pattern in which two types of regions are arranged in two directions orthogonal to each other. That is, the binarized pattern can be a grid pattern.

Embodiment 3

Figure 6:
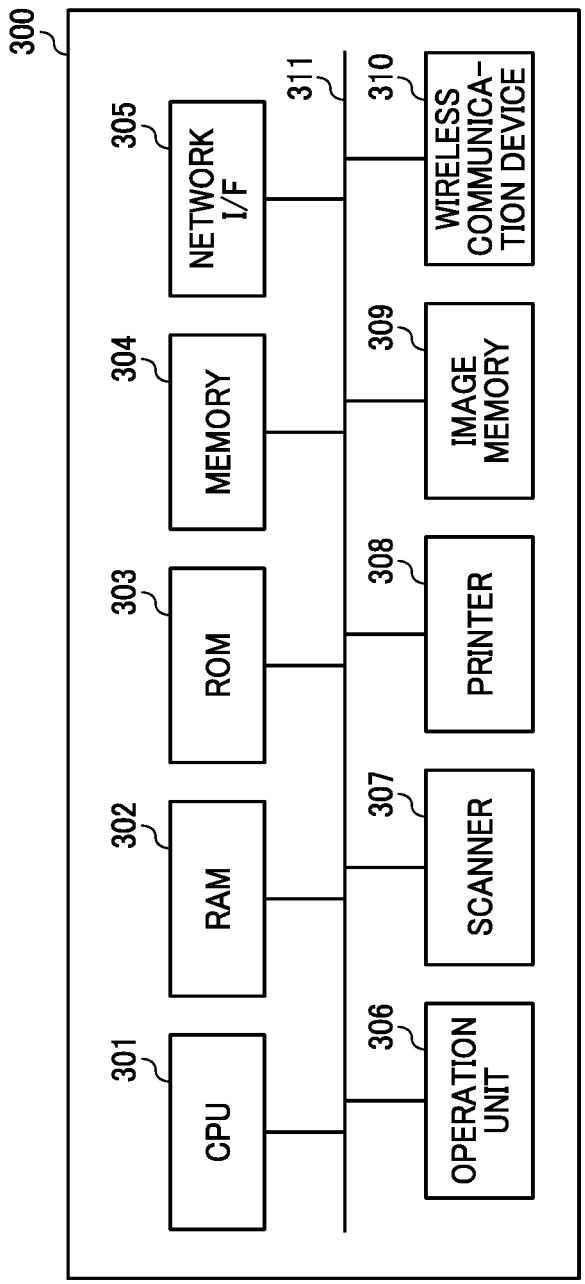
FIG. 6 is a block diagram illustrating a hardware configuration of an image forming apparatus according to Embodiment 3.

Hereinafter, a description is given of Embodiment 3 of the present disclosure. Embodiment 3 relates to an image forming apparatus suitable for implementing the printed matter manufacturing method according to Embodiment 2. FIG. 6 is a block diagram illustrating a hardware configuration of an image forming apparatus 300 according to Embodiment 3.

The image forming apparatus 300 according to Embodiment 3 includes, for example, a central processing unit (CPU) 301, a random access memory (RAM) 302, a read only memory (ROM) 303, a memory 304, a network interface (I/F) 305, an operation unit 306, a scanner 307, a printer 308, an image memory 309, a wireless communication device 310, and a bus 311.

The CPU 301 is a processor that reads out programs and data stored in, for example, the ROM 303 and the memory 304 to the RAM 302 and executes processing to implement functions of the image forming apparatus 300. The RAM 302 is a volatile memory to be used as a work area for the CPU 301. The ROM 303 is a non-volatile memory that can hold the programs and the data even after power is turned off and back on.

The memory 304 is a mass storage, such as a hard disk drive (HDD) and a solid state drive (SSD), and stores, for example, an operating system (OS), an application program, and various types of data. The network interface I/F 305 is an interface that connects the image forming apparatus 300 to a network. The operation unit 306 is a display and input device, such as a touch panel, for displaying and inputting. The operation unit 306 doubles as an input device to accept an operation and input from a user and a display device such as a liquid crystal display (LCD).

The scanner 307 is a reading device that reads an image on a document and converts the read image into image data. The printer 308 is an image forming device that performs printing according to the image data. The image memory 309 is a memory used as a work area in image processing in reading, printing, copying, and the like of images.

The wireless communication device 310 is a communication device that communicates with a computer, a mobile phone, or the like by wireless communication such as a wireless local area network (LAN), a wireless personal area network (PAN), infrared communication, or acoustic communication. The bus 311 is connected to each of the above-described elements and transmits address signals, data signals, and various types of control signals.

Figure 7:
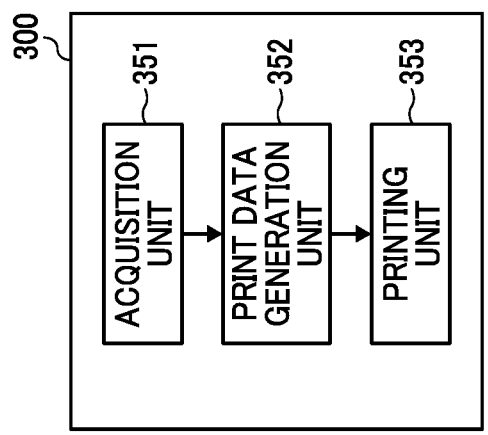
FIG. 7 is a schematic block diagram illustrating a functional configuration of the image forming apparatus illustrated in FIG. 6.

Hereinafter, a description is given of a functional configuration of the image forming apparatus 300. As described above, the CPU 301 reads out programs and data stored in the ROM 303 or the memory 304 to the RAM 302 and executes processing to implement functions of the image forming apparatus 300. FIG. 7 is a functional block diagram of the image forming apparatus 300 according to Embodiment 3. As illustrated in FIG. 7, the image forming apparatus 300 includes an acquisition unit 351, a print data generation unit 352, and a printing unit 353.

The acquisition unit 351 acquires input data indicating the area and color of the metallic luster area expressing metallic luster of the chromatic color on the recording medium. The input data can be acquired via the network I/F 305 or the wireless communication device 310. The image forming apparatus 300 can further include a slot for an external recording medium so that input data can be acquired from the external recording medium such as an integrated circuit (IC) card, a flexible disk, a compact disc (CD), a digital versatile disc (DVD), a secure digital (SD) memory card, a universal serial bus (USB) memory, or the like. The print data generation unit 352 generates print data using the image memory 309 or the like, as in S220. The printing unit 353 performs printing using the printer 308 or the like, as in S230.

When the input data is acquired by the acquisition unit 351, the image forming apparatus 300 performs the same processing as the printed matter manufacturing method according to Embodiment 2, to produce a printed matter that expresses the metallic color texture in a pseudo manner.

The color of the metallic luster area is not limited to gold color but can be copper color, bronze color, or the like. For example, since the copper color is reddish, to express the copper color texture in a pseudo manner, the proportion of magenta in the base color is increased, and the chromatic color component whose gradation value is to be binarized is magenta. Depending on the color to be expressed, gradation values of two or more chromatic color components can be binarized.

In addition, the clear toner layer can contain three or more regions which are different in amount per unit area of clear toner, and the chromatic toner layer can include three or more regions different in saturation. In this case, preferably, the amount per unit area of clear toner in the clear toner layer is smaller in the region overlapping the region of the chromatic toner layer having a higher saturation, and similar to Embodiment 1, preferably, the amount per unit area of clear toner in the region overlapping with the highest saturation region is zero to expose the highest saturation region thereunder. Note that the amount per unit area of clear toner in the description above is the amount obtained by dividing the amount of clear toner of the corresponding region by the area of the corresponding region.

In these embodiments, a clear toner is used as a glossy transparent color material and a chromatic toner is used as a chromatic color material, but the color material according to the present disclosure is not limited to toner. For example, aspects of the present disclosure can adapt to configurations in which the color material is ink or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A printed matter comprising:
    a recording medium;
    a chromatic color layer formed, with a chromatic colorant, on the recording medium;
    a plurality of first regions formed with a transparent material at intervals on the chromatic color layer; and
    a plurality of second regions, each being between adjacent two of the plurality of first regions,
    wherein a first unit material amount calculated by dividing an amount of the transparent material in the plurality of first regions by an area of the plurality of first regions is different from a second unit material amount calculated by dividing an amount of the transparent material in the plurality of second regions by an area of the plurality of second regions.

2. The printed matter according to claim 1,
    wherein the chromatic color layer includes:
        a plurality of first chromatic regions; and
        a plurality of second chromatic regions having a saturation higher than a saturation of the plurality of first chromatic regions,
    wherein the plurality of first regions is on the plurality of first chromatic regions, respectively,
    wherein the plurality of second regions is on the plurality of second chromatic regions, respectively, and
    wherein the first unit material amount is greater than the second unit material amount.

3. The printed matter according to claim 1, wherein the second unit material amount is zero.

4. The printed matter according to claim 1, wherein each of the plurality of first regions and each of the plurality of second regions alternate at regular intervals.

5. An image forming apparatus comprising:
    a printer configured to form an image on a recording medium; and
    circuitry configured to:
        acquire input data indicating an area and a color of a metallic luster area expressing metallic luster on the recording medium;
        generate print data based on the input data, the print data including:
            chromatic color layer data representing data of a chromatic color layer formed with a chromatic colorant; and
            transparent material layer data representing data of a transparent material layer formed with a transparent material, the transparent material layer including a plurality of first regions at intervals and a plurality of second regions each being between adjacent two of the plurality of first regions,
            the transparent material layer data indicating that a first unit material amount calculated by dividing an amount of the transparent material in the plurality of first regions by an area of the plurality of first regions is different from a second unit material amount calculated by dividing an amount of the transparent material in the plurality of second regions by an area of the plurality of second regions; and
        form, with the printer, the chromatic color layer on the recording medium based on the chromatic color layer data; and form, with the printer, the transparent material layer on the chromatic color layer based on the transparent material layer data.

6. The image forming apparatus according to claim 5, wherein the chromatic color layer data indicates that the chromatic color layer includes a plurality of first chromatic regions and a plurality of second chromatic regions having a saturation higher than a saturation of the plurality of first chromatic regions,
wherein the transparent material layer data indicates that:
the plurality of first regions is on the plurality of first chromatic regions, respectively;
the plurality of second regions is on the plurality of second chromatic regions, respectively; and
the first unit material amount is greater than the second unit material amount.

7. The image forming apparatus according to claim 6, wherein the circuitry is further configured to:
select at least one chromatic color component to express the color of the metallic luster area;
set, for the at least one chromatic color component selected, a first chromatic color gradation value in the plurality of first chromatic regions;
set, for the at least one chromatic color component selected, a second chromatic color gradation value in the plurality of second chromatic regions, the second chromatic color gradation value being higher than the first chromatic color gradation value;
set a first transparent gradation value in the plurality of first regions; and
set a second transparent gradation value in the plurality of second regions, the second transparent gradation value being lower than the first transparent gradation value.

8. The image forming apparatus according to claim 5, wherein the circuitry is further configured to:
select at least one chromatic color component to express the color of the metallic luster area;
binarize a gradation value of the at least one chromatic color component to generate a binarized pattern including:
a first portion assigned with a first binarized value; and
a second portion assigned with a second binarized value higher than the first binarized value;
assign, in the transparent material layer data, a first transparent gradation value to a first transparent portion overlapping the first portion of the binarized pattern;
assign, in the transparent material layer data, a second transparent gradation value to a second transparent portion overlapping the second portion of the binarized pattern, the second transparent gradation value lower than the first transparent gradation value; and
change, in the chromatic color layer data, at least one of the first binarized value and the second binarized value to approximate an average gradation value of the at least one chromatic color component in the entire metallic luster area to the gradation value before binarization of the at least one chromatic color component.

9. The image forming apparatus according to claim 5, wherein the second unit material amount is zero.

10. The image forming apparatus according to claim 5, wherein the second unit material amount is smaller than 10% of the first unit material amount.

11. A printed matter manufacturing method comprising:
designating an area and a color of a metallic luster area on a recording medium;
generating print data based on the designated area and the designated color, the print data including:
chromatic color layer data representing data of a chromatic color layer formed with a chromatic colorant; and
transparent material layer data representing data of a transparent material layer formed with a transparent material, the transparent material layer including a plurality of first regions at intervals and a plurality of second regions each being between adjacent two of the plurality of first regions,
the transparent material layer data indicating that a first unit material amount calculated by dividing an amount of the transparent material in the plurality of first regions by an area of the plurality of first regions is different from a second unit material amount calculated by dividing an amount of the transparent material in the plurality of second regions by an area of the plurality of second regions;
forming the chromatic color layer on the recording medium based on the chromatic color layer data; and
forming the transparent material layer on the chromatic color layer based on the transparent material layer data.

12. The method according to claim 11, wherein the chromatic color layer data indicates that the chromatic color layer includes a plurality of first chromatic regions and a plurality of second chromatic regions having a saturation higher than a saturation of the plurality of first chromatic regions,
wherein the transparent material layer data indicates that:
the plurality of first regions is on the plurality of first chromatic regions, respectively;
the plurality of second regions is on the plurality of second chromatic regions, respectively; and
the first unit material amount is greater than the second unit material amount.

13. The method according to claim 12, wherein the generating the print data includes:
selecting at least one chromatic color component to express the color of the metallic luster area;
setting, for the at least one chromatic color component selected, a first chromatic color gradation value in the plurality of first chromatic regions;
setting, for the at least one chromatic color component selected, a second chromatic color gradation value in the plurality of second chromatic regions, the second chromatic color gradation value higher than the first chromatic color gradation value;
setting a first transparent gradation value in the plurality of first regions; and
setting a second transparent gradation value in the plurality of second regions, the second transparent gradation value lower than the first transparent gradation value.

14. The method according to claim 11, wherein the generating the print data includes:
selecting at least one chromatic color component to express the color of the metallic luster area; and
binarizing a gradation value of the at least one chromatic color component to generate a binarized pattern including:
a first portion assigned with a first binarized value; and
a second portion assigned with a second binarized value higher than the first binarized value;
wherein the generating the transparent material layer data includes:
assigning a first transparent gradation value to a first transparent portion overlapping the first portion of the binarized pattern; and assigning a second transparent gradation value to a second transparent portion overlapping the second portion of the binarized pattern, the second transparent gradation value lower than the first transparent gradation value, and wherein the generating the chromatic color layer data includes changing at least one of the first binarized value and the second binarized value to approximate an average gradation value of the at least one chromatic color component in the entire metallic luster area to the gradation value before binarization of the at least one chromatic color component.

15. The method according to claim 11, wherein the second unit material amount is zero.

16. The method according to claim 11, wherein each of the plurality of first regions and each of the plurality of second regions alternate at regular intervals.

17. A printed matter, comprising:

a recording medium including a chromatic color layer formed with a chromatic colorant, and a transparent material layer formed with a transparent material;

wherein the chromatic color layer includes a plurality of first chromatic regions and a plurality of second chromatic regions having a saturation different from a saturation of the plurality of first chromatic regions;

wherein the transparent material layer includes:
  a plurality of first regions formed with a transparent material respectively on each of the plurality of first chromatic regions; and
  a plurality of second regions each between adjacent two of the plurality of first regions and respectively on each of the plurality of second chromatic regions, and wherein a second unit material amount calculated by dividing an amount of the transparent material in the plurality of second regions by an area of the plurality of second regions is less than a first unit material amount calculated by dividing an amount of the transparent material in the plurality of first regions by an area of the plurality of first regions.

18. The printed matter according to claim 17, wherein the first unit material amount is greater than the second unit material amount.

19. The printed matter according to claim 17, wherein the second unit material amount is smaller than 10% of the first unit material amount.

20. The printed matter according to claim 17, wherein the second unit material amount is zero.

21. The printed matter according to claim 17, wherein the saturation of the second chromatic regions is higher than the saturation of the first chromatic regions.

22. The printed matter according to claim 17, wherein each of the plurality of first regions and each of the plurality of second regions alternate at regular intervals.

23. The printed matter according to claim 17, wherein a ratio of the area of the first region to the area of the second region is not smaller than one to one and not greater than three to one.

24. The printed matter according to claim 21, wherein the ratio is two to one.

25. The printed matter according to claim 17, wherein the transparent material has light transmittance equal or greater than 30%.

26. An image forming apparatus, comprising:

an image forming device to form, on a recording medium, an image including a chromatic color layer formed with a chromatic colorant and a transparent material layer formed with a transparent material;

wherein the chromatic color layer includes a plurality of first chromatic regions and a plurality of second chromatic regions having a saturation different from a saturation of the plurality of first chromatic regions;

wherein the transparent layer includes:
  a plurality of first regions formed with a transparent material respectively on each of the plurality of first chromatic regions; and
  a plurality of second regions each between adjacent two of the plurality of first regions and respectively on each of the plurality of second chromatic regions, wherein a second unit material amount calculated by dividing an amount of the transparent material in the plurality of second regions by an area of the plurality of second regions is different from a first unit material amount calculated by dividing an amount of the transparent material in the plurality of first regions by an area of the plurality of first regions.

27. The image forming apparatus according to claim 26, wherein the first unit material amount is greater than the second unit material amount.

28. The image forming apparatus according to claim 26, wherein the second unit material amount is smaller than 10% of the first unit material amount.

29. The image forming apparatus according to claim 26, wherein the second unit material amount is zero.

30. The image forming apparatus according to claim 26, wherein the saturation of the second chromatic regions is higher than the saturation of the first chromatic regions.

31. The image forming apparatus according to claim 26, wherein each of the plurality of first regions and each of the plurality of second regions alternate at regular intervals.

32. The image forming apparatus according to claim 26, wherein a ratio of the area of the first region to the area of the second region is not smaller than one to one and not greater than three to one.

33. The image forming apparatus according to claim 32, wherein the ratio is two to one.

34. The image forming apparatus according to claim 26, wherein the transparent material has light transmittance equal or greater than 30%.

35. The image forming apparatus according to claim 26, wherein the chromatic colorant includes a plurality of color components different in color from each other, wherein a gradation value of one of the plurality of color components is different between the plurality of first chromatic regions and the plurality of second chromatic regions, and wherein respective gradation values of a rest of the plurality of color components are identical between the plurality of first chromatic regions and the plurality of second chromatic regions.

36. The image forming apparatus according to claim 35, wherein the one of the plurality of color components is a yellow component, and a gradation value of the yellow component is different between the plurality of first chromatic regions and the plurality of second chromatic regions.

37. The image forming apparatus according to claim 35, wherein one of the plurality of color components is a magenta component.

38. The image forming apparatus according to claim 26, wherein the first chromatic region and the second chromatic region alternate in a metallic luster area expressing metallic luster.

39. The image forming apparatus according to claim 26, wherein the chromatic colorant is toner.

40. The image forming apparatus according to claim 26, wherein the chromatic colorant is ink.

* * * * *